REVERSIBLE COUNTING SYSTEM FOR LOCATING MOVING OBJECTS

Filed Sept. 14, 1962 7 Sheets-Sheet 1

INVENTOR.
D. W. BRAMER
BY Forest B. Hitchcock
HIS ATTORNEY

REVERSIBLE COUNTING SYSTEM FOR LOCATING MOVING OBJECTS

Filed Sept. 14, 1962 7 Sheets-Sheet 2

| FF 7 | FF 6 | FF 5 | FF 4 | FF 3 | FF 2 | FF 1 | LOCATION |
|---|---|---|---|---|---|---|---|
| 0 | 0 | 1 | 0 | 1 | 0 | 0 | 20 |
| 1 | 0 | 1 | 0 | 1 | 0 | 0 | 21 |
| 0 | 1 | 1 | 0 | 1 | 0 | 0 | 22 |
| 1 | 1 | 1 | 0 | 1 | 0 | 0 | 23 |
| 0 | 0 | 0 | 1 | 1 | 0 | 0 | 24 |

INVENTOR.
D. W. BRAMER
BY
Forest B. Hitchcock
HIS ATTORNEY

REVERSIBLE COUNTING SYSTEM FOR LOCATING MOVING OBJECTS

Filed Sept. 14, 1962 7 Sheets-Sheet 3

INVENTOR.
D. W. BRAMER
BY
Forest B. Hitchcock
HIS ATTORNEY

REVERSIBLE COUNTING SYSTEM FOR LOCATING MOVING OBJECTS

Filed Sept. 14, 1962 7 Sheets-Sheet 4

INVENTOR.
D.W.BRAMER
BY Forest B. Hitchcock
HIS ATTORNEY

REVERSIBLE COUNTING SYSTEM FOR LOCATING MOVING OBJECTS

Filed Sept. 14, 1962 7 Sheets-Sheet 5

INVENTOR.
D.W. BRAMER
BY Forest B. Hitchcock
HIS ATTORNEY

INVENTOR.
D.W.BRAMER
BY
Forest B. Hitchcock
HIS ATTORNEY

REVERSIBLE COUNTING SYSTEM FOR LOCATING MOVING OBJECTS

Filed Sept. 14, 1962 7 Sheets-Sheet 7

INVENTOR.
D.W. BRAMER
BY Forest B. Hitchcock
HIS ATTORNEY

United States Patent Office 3,284,614

Patented Nov. 8, 1966

3,284,614

REVERSIBLE COUNTING SYSTEM FOR LOCATING MOVING OBJECTS

Donald W. Bramer, Fairport, N.Y., assignor to General Signal Corporation, a corporation of New York Filed Sept. 14, 1962, Ser. No. 223,671
14 Claims. (Cl. 235—92)

This invention relates to counting systems, and more particularly to a reversible counting and storage system for counting objects in relative motion with a detector and providing location information based on the number of objects counted.

Where a plurality of trains run over a track network, information as to identity and location of each train is necessary to facilitate efficient system operation from a central control point. A system for transferring information or data between trains and wayside locations is disclosed in U.S. patent application Ser. No. 142,372, filed October 2, 1961, now Patent No. 3,106,376, by W. G. Pettitt, entitled Code Communication System, and assigned to the common assignee; however, in a large track network having many possible locations at which data is desired, cost of the system becomes excessive because a code transmitter is required at each location.

To reduce the cost of an efficient system without reducing its effectiveness, the system embodied herein substitutes inert coils tuned to distinctive radio frequencies for relatively expensive code transmitters. The only code transmitters required by this system are those at specified master locations along the wayside which transmit collected data to a central location.

The novel system herein disclosed may be used at a fixed location to count moving objects or on a moving object to count locations traversed in either direction by the moving object. When used in the former manner, a counter and associated apparatus are mounted along the wayside and a pair of inert or non-radiating tuned radio frequency coils (herein referred to as RF coils) are mounted on each passing object or vehicle. When used in the latter manner, a counter and associated apparatus are mounted on the vehicle and pairs of inert tuned RF coils are mounted along the wayside so as to be in inductive proximity to the passing vehicles. The latter manner of application is described herein in conjunction with train operation within a track network, although it is to be understood that this specific application is not intended to limit the scope of the invention.

In general, this system may be used in conjunction with a code communication system, such as the system disclosed in the aforementioned Pettitt application, it may be used per se provided the counter is set at a predetermined reference point. When used in conjunction with a code communication system, information is read from a code transmitter into the counter, which is mounted on the locomotive each time the locomotive passes a predetermined master location. At intermediate locations, inert, tuned RF coils are located along the wayside. As the locomotive passes each intermediate location, an addition or subtraction to the initial code registered at the preceding master location is made, enabling a particular train to be followed from one location to another regardless of the direction traveled. At the next predetermined master location, new information is read into the counter from the wayside unit. Information stored in the counter is transmitted, preferably by VHF radio link, from the locomotive to a central location, where it may then be presented on an indicator.

When the counting system is used without the code communication system previously referred to, the counter can be set manually or by other read-in means at the start of a run. The counter then adds or subtracts locations depending upon direction of travel of the locomotive. Therefore, one object of this invention is to provide a simple, reliable system for counting and registering objects in relative motion with a sensor.

Another object of this invention is to provide simple, reliable means for determining direction of vehicle travel.

Another object of this invention is to provide a counting system which is compatible with binary storage systems.

Another object is to provide a method for presenting train location information on an indicating device in order that all trains within a track network may be readily monitored.

Another object is to provide a counting system having inert devices for actuating a counter.

Another object is to provide a system for counting predetermined locations traversed by a vehicle independent of vehicular orientation, stops and reverses.

Another object is to provide means along a wayside for actuating a vehicle-carried counter without need of a wayside source of energy.

Other objects of this invention will become apparent from the specification, drawings, and appended claims.

Figure 3A:
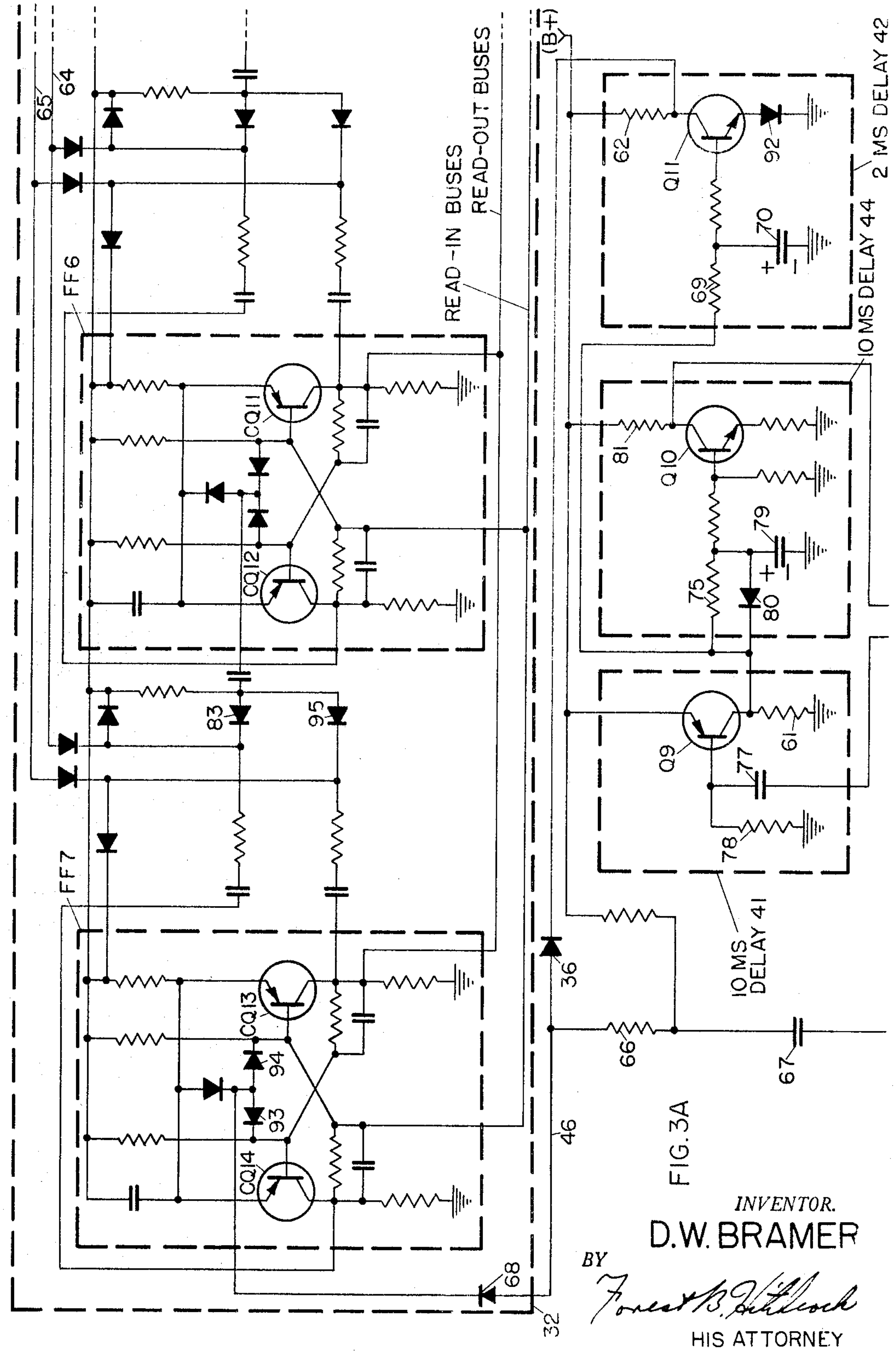
Figure 3B:
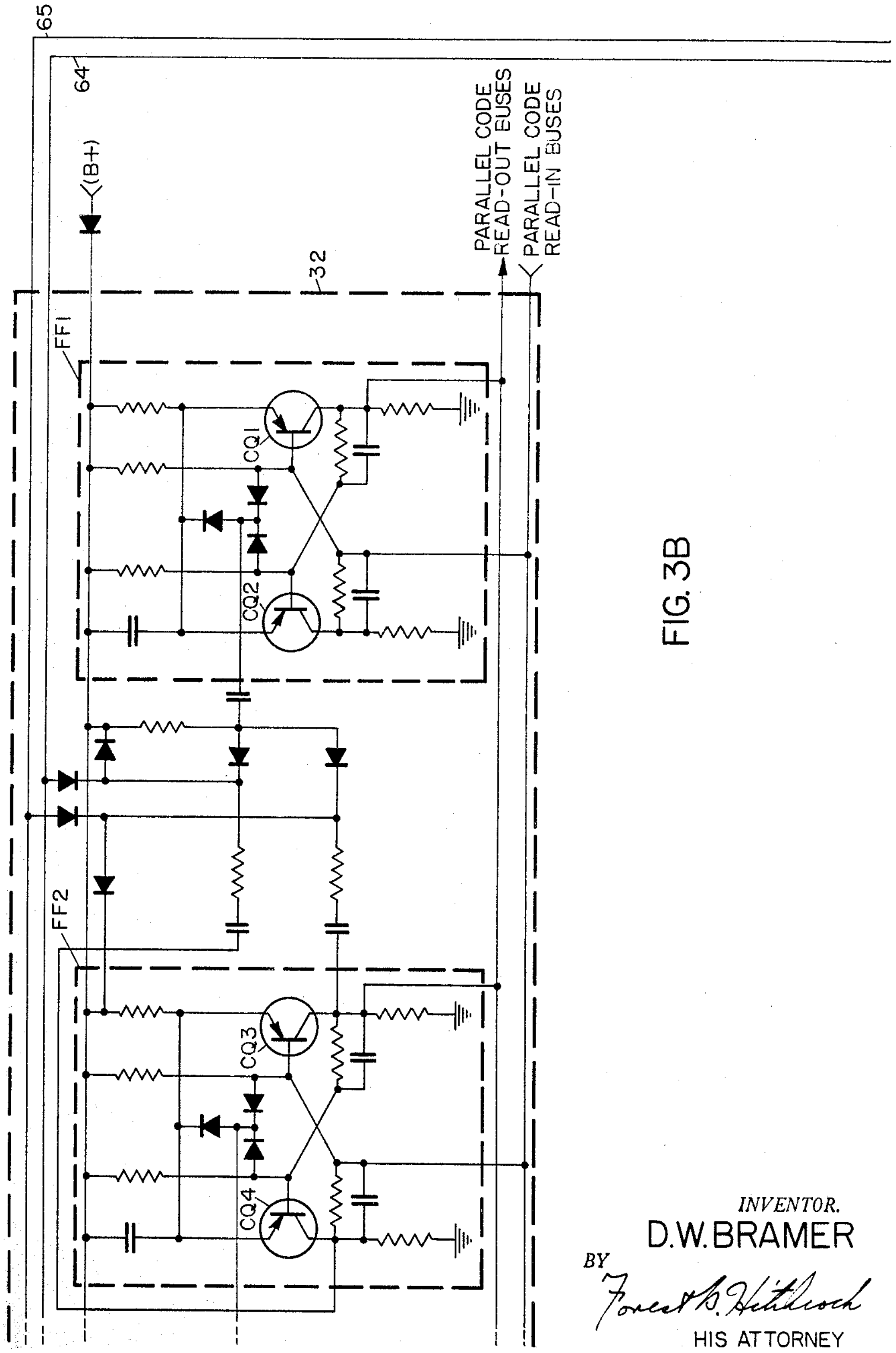
Figure 3C:
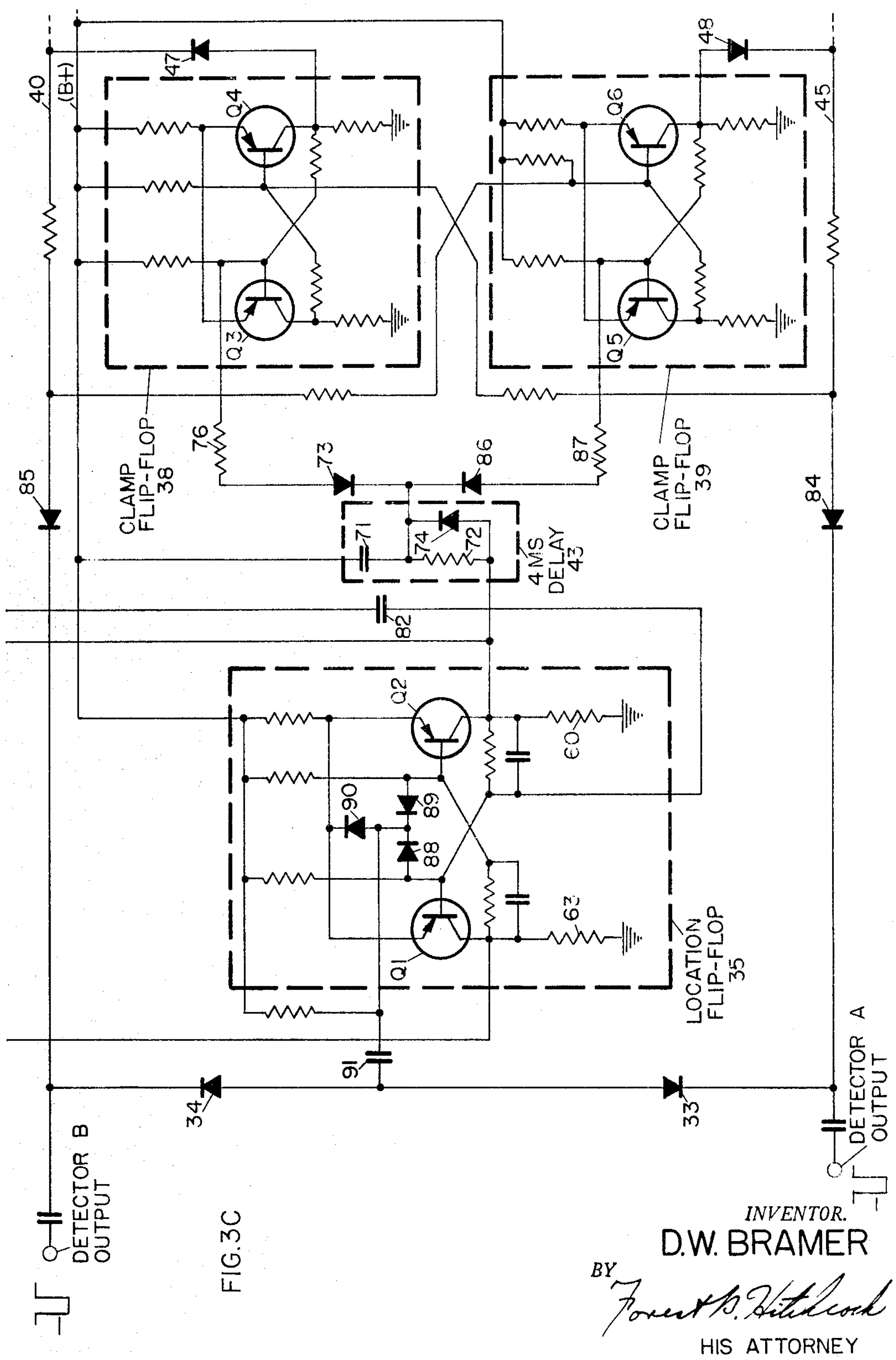
Figures 3D, 4:
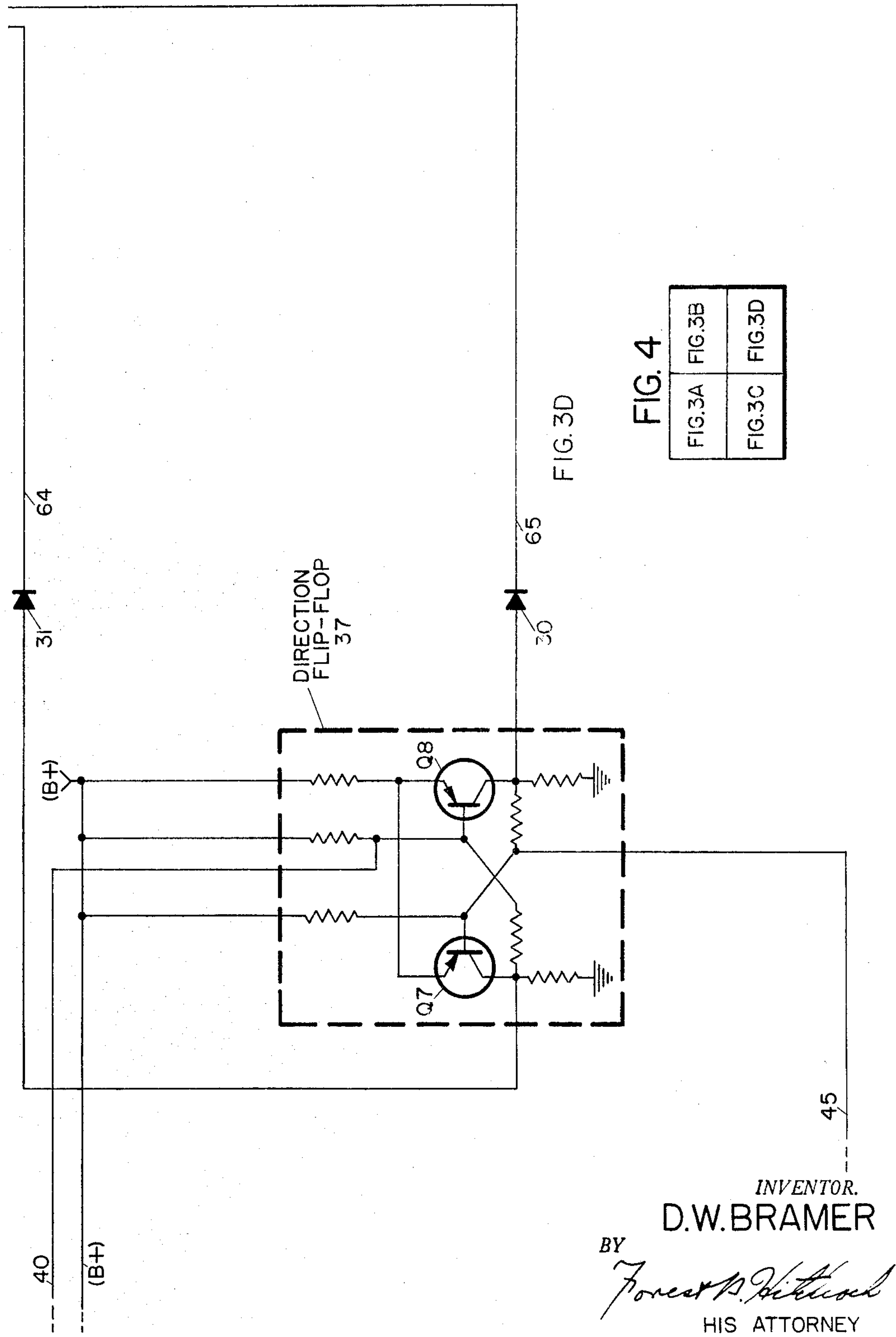

FIGS. 3A, 3B, 3C and 3D, when arranged according to FIG. 4, illustrate schematically the train-carried circuits embodied in this invention;

FIG. 4 illustrates the arrangement of FIGS. 3A through 3D; and

Figure 5:
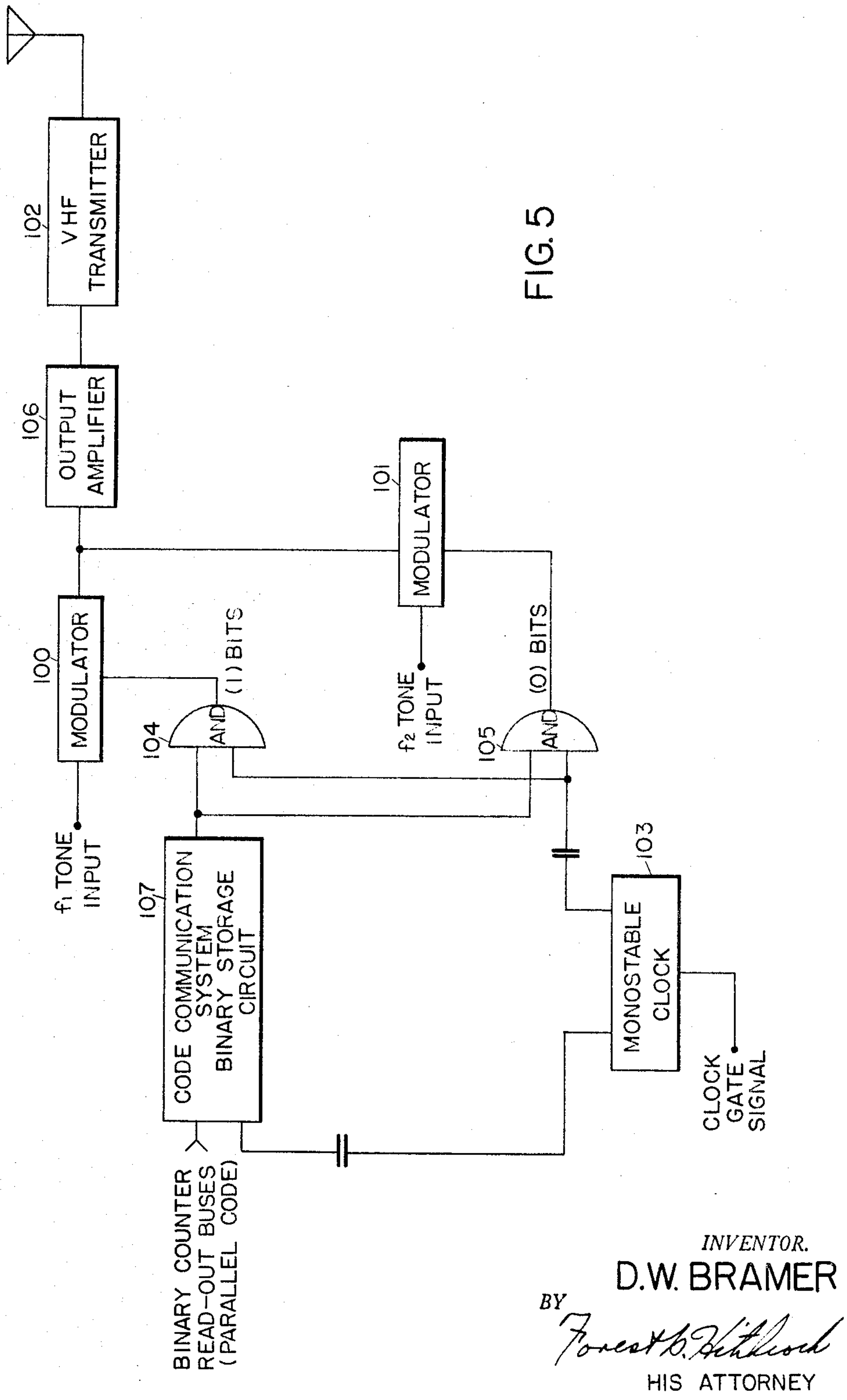

FIG. 5 is a block diagram of means for converting stored binary indications to sequentially modulated VHF.

The invention contemplates a binary counter capable of accepting a predetermined count from an external source, passive means for altering the count, and means for communicating the altered count to a remote indicator without destroying the count.

In general, the counter will add or subtract as determined by the sequence of a pair of inputs to the counter. For example, if two input pulses, such as A and B, are applied to the counter in alphabetical sequence the counter will add a count of one; on the other hand, if the B pulse precedes the A pulse, the counter will subtract a count of one. A plurality of flip-flops, or bistable multivibrators, are used for conditioning the counter for addition or subtraction, supplying an input to actuate the counter after conditioning, supplying clamping voltages, and starting various timing circuits. The timing circuits reset the multivibrators to their initial conditions after a complete count, or, should the counter be conditioned by reception of the A pulse and not receive the B pulse, a particular timing circuit will reset the system so as to properly register the next succeeding count.

The multivibrator inputs are supplied with negative-going voltage pulses which turn "on" the half of the bistable multivibrator which initially is "off." These pulses are derived from a detector having a pick-up coil inductively coupled to a tuned resonant circuit.

A pair of detectors and their associated pick-up coils are located on the vehicle spaced apart from each other on an axis coincident with the direction of travel. The spacing between the coils is less than the spacing between a pair of inert or passive resonant circuits comprising tuned coils and located along a defined path of vehicular travel. Each passive coil is resonant at a unique frequency corresponding to the respective unique frequency of an oscillator in each of the vehicle-carried detectors.

Figure 1:
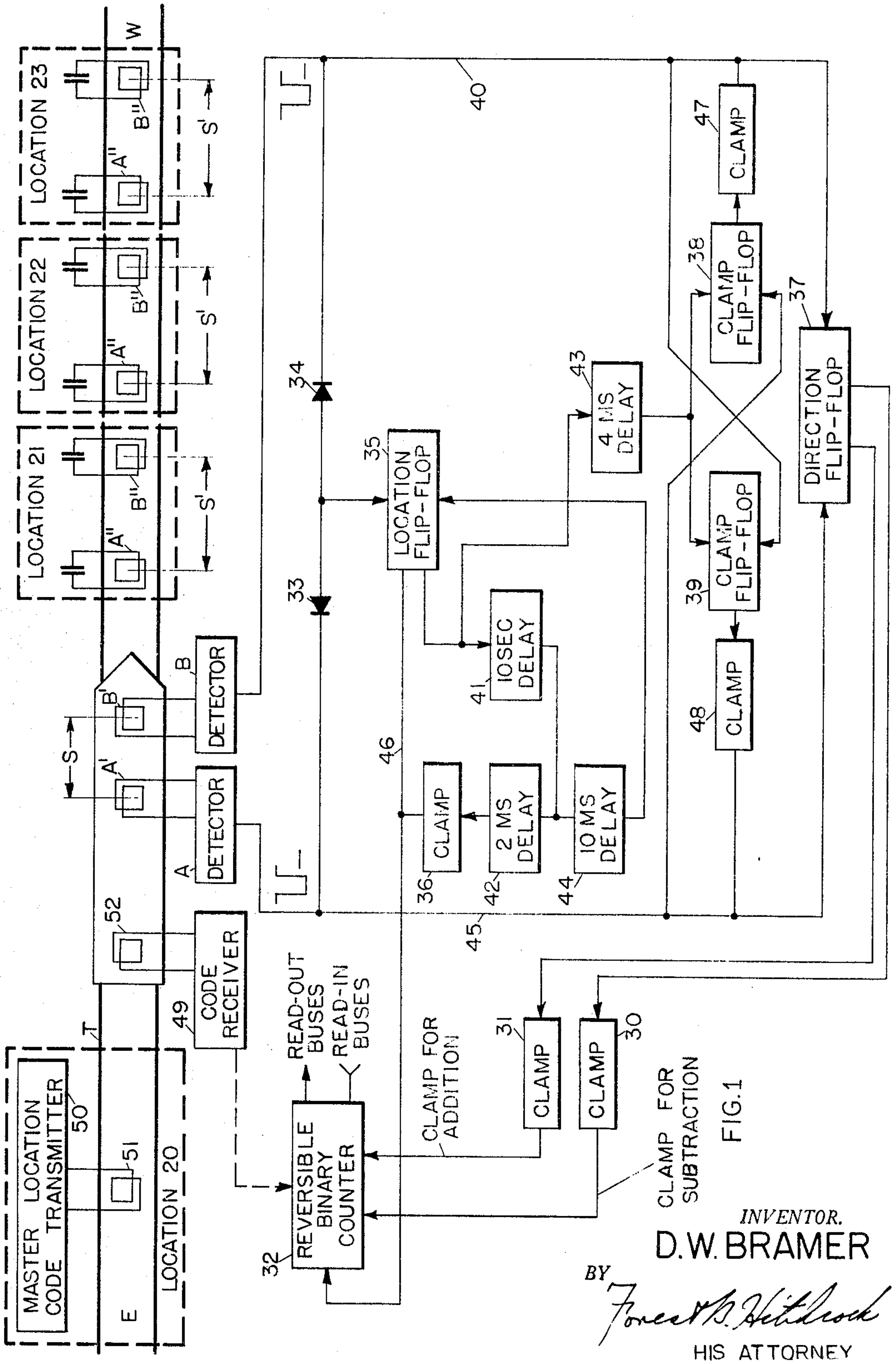
FIG. 1 is a general block diagram of the system as utilized with a track network.

Referring now to FIG. 1, several inert locations 21, 22 and 23 are shown along a stretch of track T, each having a pair of passive tuned RF coils A″ and B″, spaced apart from each other by a distance S′. A master location 20, where an initial count is transferred to the vehicle-carried binary counter, is shown along tract T.

Pick-up coils A′ and B′ are mounted on a vehicle, such as a locomotive, connected to their respective unique frequency detectors A and B, and spaced a distance S between their central axes. Thus, when the vehicle travels from E to W, the A′ and A″ coils will inductively couple prior to inductive coupling of the B′ and B″ coils. Shortly thereafter, the B′ and B″ coils will inductively couple. Since each incidence of coupling generates a detector voltage pulse, the B pulse always follows the A pulse whenever the vehicle travels from E to W. If the vehicle travels in the reverse direction, the B pulse is initiated in advance of the A pulse; consequently, W to E travel of the vehicle is detected. The combination of an A pulse followed by a B pulse adds one count to the initial count supplied at the master location 20, while if a B pulse is generated in advance of an A pulse a subtraction from the initial count occurs. Because coils A″ and B″ are resonant at discretely different frequencies, neither the A′ and B″ nor A″ and B′ coils can inductively couple and produce a false indication.

If a seven bit binary code is utilized, $2^7$ or 128 different locations may be described by the system but more stages may be added to increase data-handling capacities of the system. A locomotive travelling from E to W receives a sequentially transmitted binary code (0010100), which has a decimal equivalent of 20, when passing the master location 20. When the code receiver 49 carried aboard the locomotive receives a complete code from a master location code transmitter 50, through antennas 51 and 52, it immediately transfers the code in parallel form to a reversible binary counter 32 for storage. The code may then be read back to the train-carried code communication system equipment to be combined with other pertinent information and retransmitted to a distant control tower. The transmitter and receiver are preferably rapid repetition rate pulse type units, though other units may be used instead. Because the read-out circuits are of the nondestructive type, the code is undisturbed in the binary counter during this operation cycle, and remains there to be altered only when crossing the next location. It should be noted that the code for counter 32 may be set up by manual means rather than by a receiver and therefore the connection to the counter from receiver 49 is shown dotted.

Location 21 is an inert coil location and a binary equivalent of 0010101 must be sent back to the tower to describe the location. Both locomotive pick-up coils A′ and B′ must be excited in sequence by traversing the inert coils before the new location is established in the binary counter. Pick-up coil A′ in this instance, is first to be excited because it passes over coil A″ before pick-up coil B′ passes over coil B″ as previously explained. Each pick-up coil actuates an associated detector. Thus, detector A produces an output pulse, triggering associated logic circuitry which conditions the binary counter to add rather than subtract upon command when coil B″ is inductively coupled by pick-up coil B′. Detector B, upon inductive coupling of coils B′ and B″, produces an output pulse triggering the logic circuitry back to its original state. As the logic circuitry returns to its rest condition, it produces a shift pulse which augments the binary counter so that it now stores a new code (0010101). The new code may be read back into the code communication system equipment combined with other information and transmitted to the control tower as previously explained in connection with location 20. If the system tranverses another location, 22, it will respond in a similar manner and store the code 0010110, which has a decimal equivalent of 22, in the binary counter. When location 23 is traversed, the stored code will become 0010111 and so on until a master code communication system location is passed, establishing a new code.

Now assume a location 24 (not shown) as a code communication system master and that a train is moving from W to E away from this location. The train-carried logic circuitry accommodates the reverse direction by conditioning the binary counter to subtract, rather than add counts. The logic circuitry operates on the fact that detector B is first to be excited, and conditions the binary counter accordingly. The binary code transmitted from the general reporting system master at location 24 is 0011000. This count is decreased to 0010111 when passing inert coil location 23, to 0010110 at location 22, and to 0010101 at location 21. The count is independent of locomotive orientation; that is, the train may either be heading and travelling from W to E or simply reversing through the inert locations.

Now assume the locomotive is moving from E to W and approaching an inert location. Detector A on the locomotive is excited first, producing a negative output pulse. The negative pulse coupled through a diode 33 to a location flip-flop circuit 35 immediately triggers the location flip-flop circuit to its opposite state. This in turn triggers a ten second, normally conducting, time delay circuit 41 out of conduction, removing the clamping action of a clamp circuit 36 from a shift pulse line 46 coupling flip-flop 35 to the binary counter. The output pulse of detector A also drives a direction flip-flop circuit 37 to the state which conditions counter 32 for addition, and a clamp flip-flop 38 to its opposite state. Clamp flip-flop 38 now actuates a clamp 47 which clamps the main pulse line 40 from detector B such that direction flip-flop 37 cannot reverse state when pick-up coil B′ passes coil B″. By clamping action through a clamp circuit 31 connected between direction flip-flop 37 and counter 32, the direction flip-flop conditions the binary counter, which is afterward stepped by a shift pulse for addition.

Pick-up coil B′ next passes over coil B″ at the same inert location, so that detector B produces a negative output pulse. This immediately triggers location flip-flop 35 back to rest condition through a diode 34. The shift pulse necessary to step the binary counter is produced in the location flip-flop circuit and is coupled to the counter to advance its count by one location. When the location flip-flop switches back to rest condition, the ten second time delay circuit 41 is restored to conduction, driving clamp 36 back into conduction through a 2 millisecond delay circuit 42 which allows time for the short duration shift pulse to occur. The switching action of the location flip-flop also triggers clamp flip-flop 38 back to its original state, unclamping line 40. However, this action is delayed through a four millisecond delay circuit 43, which results in keeping the detector B output pulse clamped and preventing reconditioning of the binary counter during occurrence of a shift pulse. The logic circuitry is thus returned to its quiescent condition and the train travels on toward another inert location where like cycling of the circuitry will advance the location count further.

When the train travels from W to E, detector B on the locomotive is first to provide an output pulse. This pulse cycles the logic and timing circuitry as before, by triggering the location flip-flop circuit to the opposite state. For this direction of travel, however, a clamp flip-flop 39 is triggered by the detector B output pulse to clamp the detector A main pulse line 45 through a clamp circuit 48. Clamp flip-flop 38 is unaffected. The detector B output pulse triggers the direction flip-flop circuit 37 which, by clamping action through a clamp 30 connected between the direction flip-flop and binary counter 32, conditions the binary counter to subtract. When detector A is next excited by pick-up coil A′ passing over inert coil A'', it resets the circuitry, with the resultant shift pulse causing subtraction of a location count in a manner similar to that previously described for E to W travel.

It is possible that the locomotive might back up towards a previous inert location just far enough that only detector B were excited, and then resume forward travel. Thus, assume the locomotive were situated between locations 21 and 22. If the locomotive were then to back up towards location 21 just far enough that only detector B were excited, the logic circuitry would condition the binary counter for subtraction of locations. The locomotive might then move forward to location 22 where detector A, being first to be excited, would cause the binary counter to store the code of 0010100, and a location of 20 rather than 22 would thus be transmitted back to the central location, or tower. If the train were to continue in an E to W direction, detector B, excited by pick-up coil B' at location 22, would cause the logic circuitry to condition the binary counter to subtract another location when the train passed through location 23 and so on, until a general reporting system master location were reached. Thus, the codes transmitted back to the tower would indicate that the train were traveling in a W to E direction, and the count would be in error by twice the number of inert locations passed. Another undesirable situation might arise if a locomotive approached location 22 for example, moved through the location only far enough to excite detector A, and then reversed, making another pass over coil A''. This would affect the logic and counter circuitry as though the B'' inert coil were actually passed by the B' pick-up coil, by adding a count of one. If the locomotive were then to resume its E to W direction, a second pass through location 22 would advance the location count to a number one beyond that which it should be. Erroneous indications similar to those described also would occur if directions opposite to those previously assumed were taken. To obviate those difficulties, timing circuitry is incorporated in the system. A finite length of time if required for a train to travel from one location to another or to stop, reverse, and move forward again. When the location flip-flop changes state, as it does when the first detector output pulse occurs at a given location, time delay circuit 41 cuts off for approximately ten seconds. If the second coil of the inert location is not detected during this interval, the ten second time delay circuit resets to a conducting state. The pulse produced by this resetting action passing through two millisecond delay circuit 42 causes the delay circuit to clamp the shift pulse line 46 through clamp 36 two milliseconds after resetting. Approximately eight milliseconds later, a ten millisecond delay circuit 44 passes a pulse produced by resetting of ten second delay circuit 41, which resets the location flip-flop to the quiescent state. Because clamp 36 is applied before a shift pulse created by resetting of the location flip-flop occurs, false stepping of counter 32 is prevented.

Figures 2A, 2B:
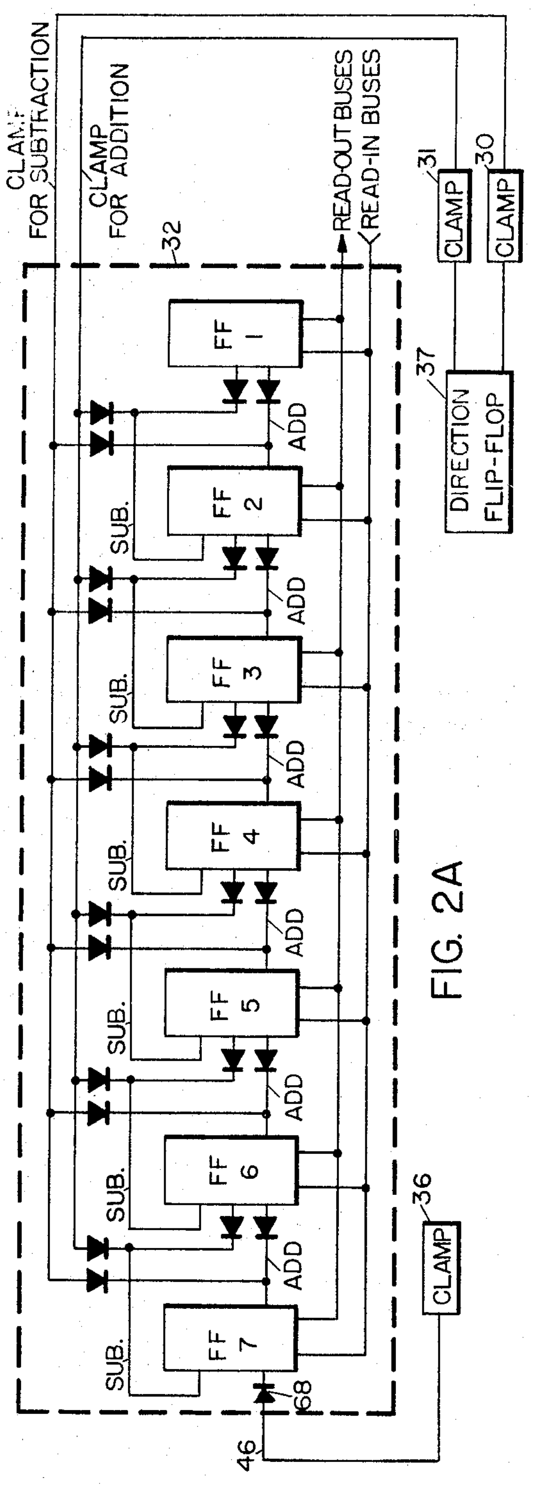
FIG. 2A is a block diagram of the reversible binary counter used with the system.
FIG. 2B is a chart for aiding in explanation of operation of the reversible binary counter.

Turning now to FIGS. 2A and 2B for explanation of operation of the reversible binary counter 32, the counter of FIG. 2A is shown made up of seven bistable multivibrator flip-flop stages, FF1–FF7. Each flip-flop stage is coupled through two unidirectionally conducting output networks to the succeeding stage; one output network being coupled from each side of stages FF2–FF7. Reversing is achieved by selection of a particular side of each flip-flop stage for driving the next succeeding stage.

Assume that a code of 0010110 appears on the flip-flops, reading from right to left in FIG. 2A. This corresponds to location 22, as seen in FIG. 2B. Due to the polarized coupling networks between stages, only changes in state from 1 bits to 0 bits, representing a negative change in flip-flop output voltage, will effect a change in the next succeeding flip-flop when the counter is conditioned for addition. If the output or "subtract" lines on the left side of each flip-flop stage FF2–FF7 are clamped by clamp 31, only the information bits stored in the right side of each flip-flop will be allowed to couple into successive stages, through the right or "add" lines. When the second inert coil of each location is passed, the logic circuitry produces a shift pulse on line 46 which triggers stage FF7 of the counter, and through interstage coupling a code of 0010111 appears on the read-out buses. Thus, an addition of location counts is performed going west.

Assume again that a code of 0010110 appears on the read-out buses. If the train now moves in the opposite direction, the counter is conditioned for subtraction. When the train passes through an inert location, the direction flip-flop selects the left or "subtract" flip-flop output lines for coupling succeeding stages, and the output or "add" lines on the right side of each stage FF2–FF7 are clamped by clamp 30. When a shift pulse occurs the code changes to 0010101, thus subtracting a location. The codes received by the general reporting system equipment when passing a master location are transferred to the reversible binary counter by means of parallel code read-in buses.

FIG. 2B is a representation of bits stored in each of the counter stages FF1–FF7, at locations 20–24.

Turning next to FIGS. 3A–3D for a detailed description of operation of the system, location flip-flop 35 is shown as including PNP transistors Q1 and Q2, clamp flip-flop 39 includes PNP transistors Q5 and Q6, clamp flip-flop 38 includes PNP transistors Q3 and Q4, direction flip-flop 37 includes PNP transistors Q7 and Q8, delay circuit 44 includes NPN transistor Q10, delay circuit 42 includes NPN transistor Q11, and delay circuit 41 includes NPN transistor Q9. Transistors Q1, Q3, Q5, Q7, Q9, Q10 and Q11 all conduct when the logic is in rest condition between locations and the locomotive, moving in an E to W direction as shown in FIG. 1, has passed at least one inert location. Assume the locomotive is approaching an inert location. When the first inert coil is inductively coupled by a pick-up coil, thereby loading the pick-up coil, detector A, as previously explained, is excited first, producing a negative output pulse. This pulse, coupled through diode 33, a coupling capacitor 91 and a steering diode 89 to the base of transistor Q2, triggers location flip-flop 35 to the opposite state because the base of transistor Q2 is driven negative, causing the transistor to conduct. Thus transistor Q2 is triggered because the anode of diode 89 is more positive than the anode of a steering diode 88 connected between the base of transistor Q1 and diode 89, due to conduction of transistor Q1 which thus has less positive base voltage than non-conducting transistor Q2. Therefore diode 89 switches to a low impedance state at less negative cathode voltage than diode 88, coupling the negative pulse to transistor Q2 rather than Q1. Because the output pulse of detector A is designed to be a square wave, triggering occurs at the instant the pulse is produced. At this instant, the voltage on the collector of transistor Q2 goes positive due to increased voltage drop across its collector resistor 60. This increase in positive voltage is coupled to the base of transistor Q1, cutting it off. Diode 34 prevents the output plulse of detector A from appearing at the output of detector B.

At the instant transistor Q2 begins conduction, transistor Q9 (FIG. 3A) is triggered out of conduction because the positive increase in collector voltage on transistor Q2 is coupled to the base of transistor Q9. This causes a drop in collector current through transistor Q9 and its collector resistor 61, so that collector voltage of transistor Q9 swings negative. This immediately drives transistors Q10 and Q11 into cut-off, since their bases are coupled to the collector of transistor Q9. Transistor Q11 then ceases to draw collector current through its collector resistor 62, so that its collector voltage swings positive. This increases positive potential on the anode of clamping diode 36, unclamping shift pulse line 46 since positive pulses applied to the shift pulse line can no longer be grounded through transistor Q11. The negative output pulse of detector A, resistively coupled to direction flip-flop 37, has no effect on the direction flip-flop because the pulse is applied to the base of transistor Q7, which is already in conduction; however, it drives clamp flip-flop 38 (FIG. 3C) to the opposite state by triggering transistor Q4 on and coupling its resulting increased positive collector voltage to the base of transistor Q3, cutting it off. Transistor Q4 then clamps the main pulse line 40 through diode 47, holding the line and the bases of transistors Q8 and Q6 positive so that direction flip-flop 37 (FIG. 3D) and clamp flip-flop 39 (FIG. 3C) cannot change state when pick-up coil B′ of detector B passes coil B″. The clamping action of transistor Q7 through diode 31 on a line 64 coupling direction flip-flop 37 to binary counter 32 maintains the line positive so that when the binary counter is stepped by a shift pulse, it will add. Thus, line 64 is designated the "Clamp For Addition" line.

When pick-up coil B′ of detector B passes over coil B″ at the same inert location, thereby loading coil B′, detector B produces a negative output pulse which is coupled through diode 34, capacitor 91 and diode 88 to the base of transistor Q1, triggering it on. This triggering of transistor Q1 occurs because the anode of diode 88 is more positive than the anode of diode 89, due to conduction of transistor Q2, which has less positive base voltage than nonconducting transistor Q1. Thus, diode 88 switches to a low impedance state at less negative cathode voltage than diode 89, coupling the negative pulse to transistor Q1 rather than Q2. Because the output pulse of detector B is designed to be a square wave, triggering occurs at the instant the pulse is produced. Collector current is thus drawn through a collector resistor 63 of transistor Q1, cutting off transistor Q2. Therefore, location flip-flop 35 is immediately triggered back to its rest condition. Diode 33 prevents the output pulse of detector B from appearing at the output of detector A while a diode 90, coupling the cathodes of steering diodes 88 and 89 to a positive voltage, assures fast recovery of coupling capacitor 91 by rapidly leaking off accumulated charge on the capacitor 91 after each triggering of flip-flop 35.

The collector of transistor Q1 is RC coupled through a series-connected resistor 66 and capacitor 67 to the shift pulse line 46 (FIG. 3A). The shift pulse line is connected to the binary counter through a diode 68 so polarized as to permit only positive pulses to actuate the counter. The shift pulse necessary to step the binary counter is produced on the collector of transistor Q1 and is thereby RC coupled to the counter 32, advancing the count in the counter by one location each time detector B produces an output pulse turning transistor Q1 on. It should here be remembered that the direction of travel of the locomotive is from E to W as shown in FIG. 1.

When transistor Q2 switches back to cut-off, transistor Q9 is restored to conduction, driving both transistors Q10 and Q11 back into conduction. Clamping action of transistor Q11 through diode clamp 36 is delayed by two milliseconds in order to allow time for the short duration shift pulse to occur. The two millisecond delay is caused by the time constant of a resistor 69 and capacitor 70 in the base circuit of transistor Q11. Upon receiving a positive voltage from the collector of transistor Q9 when its conduction is restored, a finite length of time is required for capacitor 70 to charge to an amplitude which drives the base of transistor Q11 positive enough to cause conduction. A diode 92, connecting the emitter of transistor Q11 to ground, assures sharp turn-on action for the transistor by requiring a predetermined value of emitter voltage before switching to its low impedance state to permit conduction of the transistor. Resistor 69 and capacitor 70 are so chosen that transistor Q11 will not begin conduction until after a two millisecond interval following restoration of transistor Q9 conduction.

The switching action of transistor Q2 also triggers clamp flip-flop 38 back to its original state. This action is delayed four milliseconds by the action of delay circuits 43 (FIG. 3C), such that the detector B output pulse remains clamped, preventing reconditioning of the binary counter during occurrence of a shift pulse. Capacitor 71 instantaneously assumes a specific voltage determined by transistor Q2 collector voltage when the transistor begins conduction, since in this instance resistor 72, connected between the collector of transistor Q2 and capacitor 71, is substantially short circuited by diode 74. Then, when transistor Q2 cuts off, its collector voltage goes negative.

Some of the charge on capacitor 71 then leaks off at a rate determined substantially by the time constant of a series circuit comprising capacitor 71 and resistor 72. A series circuit comprising a diode 73, polarized so as to pass only negative pulses, and a resistor 76 is connected between the base of transistor Q3 and a point common to a capacitor 71 and resistor 72. The values of components are so selected that four milliseconds after transistor Q2 cuts off, base-to-emitter voltage on transistor Q3 will be driven sufficiently negative to cause transistor Q3 to conduct. The resulting increase in transistor Q3 collector voltage is coupled to the base of transistor Q4, cutting it off. The logic circuitry is thus returned to its quiescent condition and the train travels on towards another inert location where like cycling of the circuitry will advance the location count further.

If the train moves in the opposite direction, that is, W to E, operation of the circuit is similar to that already described, except that detector B produces an output pulse before detector A. In this instance, however, clamp flip-flop 39 is triggered, rather than clamp flip-flop 38, so that line 45 rather than line 40 is now clamped. Also in this instance, the detector B pulse, resistively coupled to direction flip-flop 37, triggers transistor Q8 (FIG. 3D), turning it on, in turn cutting off transistor Q7 in a manner similar to that already described for other flip-flop stages. In addition, when transistor Q8 turns on, its collector voltage swings positive, clamping line 65, designated the "Clamp For Subtraction" line, through diode 30. Thus, a shift pulse produced on line 46 causes the counter to subtract a count for each shift pulse. The detector A pulse, in this instance, resets the logic circuitry in the same manner as the B pulse in the previous instance, utilizing the same delay circuits. However, clamp flip-flop 39 is reset by delay circuit 43 through a series-connected diode 86 and resistor 87.

The time required for a train to travel from one location to another, or to stop, reverse and move forward again, is utilized in the logic circuitry to eliminate false readings. When location flip-flop 35 changes state upon detection of the first detector pulse at any given location, the time delay circuit 41 (FIG. 3A) starts timing for approximately 10 seconds. This is accomplished by coupling the collector of transistor Q2 to the base of transistor Q9 through a capacitor 77. A resistor 78 is connected between the base of transistor Q9 and ground. Thus, when transistor Q2 begins conducting, increasing its collector voltage, a transient current flows from the collector to ground through capacitor 77, which is initially uncharged, and resistor 78. The voltage drop across resistor 78 biases the base of transistor Q9 positive, thereby cutting it off at the instant transistor Q2 begins conducting. Capacitor 77 then begins to charge at a rate substantially determined by the RC time constant of capacitor 77 and resistor 78, with a polarity opposing the aforementioned transient current flow. Thus, current flow through resistor 78 decreases at a rate substantially determined by the RC time constant of capacitor 77 and resistor 78, thereby lowering positive voltage on the base of transistor Q9.

The values of capacitor 77 and resistor 78 are selected so as to lower the base voltage on transistor Q9 to an amplitude which causes the transistor to resume conducting 10 seconds after transistor Q2 starts conducting. If during this ten second interval an inert location is not detected, transistor Q9 resets to a conducting condition, causing an increase in collector voltage. Two milliseconds later, delay circuit 42 causes transistor Q11 to clamp shift pulse line 46 through diode clamp 36 as previously explained. Eight milliseconds later, or ten milliseconds after Q9 resets to a conducting condition, transistor Q10 is driven back into conduction by the positive increase in collector voltage on transistor Q9. The ten millisecond delay is achieved through an RC circuit comprising resistor 75 and capacitor 79 in the base circuit of transistor Q10, in a manner similar to that described for production of the time delay in delay circuit 42. A diode 80 couples resistor 75 and capacitor 79 with the collector of transistor Q9. Thus, when transistor Q9 cuts off, its collector voltage decreases, and the charge on capacitor 79 rapidly leaks to ground through diode 80. Therefore, when transistor Q9 resumes conducting, capacitor 79 is substantially uncharged, thereby consistently supplying a ten millisecond delay in circuit 44.

When transistor Q10 resumes conduction, flow of collector current through a collector resistor 81 causes the collector to swing negative, producing a negative pulse which is coupled through a blocking capacitor 82 to the base of transistor Q1 in location flip-flop 35. This negative pulse acts to reset location flip-flop 35 and its associated circuitry to the quiescent state in a manner similar to that previously described. Because resetting of location flip-flop 35 applies clamp 36 on shift pulse line 46 through transistor Q11 before a shift pulse occurs, false stepping of the counter is prevented.

A pair of diodes, 84 and 85, connected between the outputs of detectors A and B and flip-flop circuits 37, 38 and 39, are used to assure clean negative detector output pulses for actuation of the flip-flop circuits.

Reversible binary counter 32 is shown as having seven flip-flop stages FF1–FF7, although any number of flip-flop stages may be used depending upon the quantity of information to be recorded. For simplicity, only four stages FF1, FF2, FF6 and FF7 are shown in FIG. 3. Stages FF3–FF5 are identical to stages FF2 and FF6. Stage FF1 includes transistors CQ1 and CQ2, stage FF2 includes transistor CQ3 and CQ4, stage FF6 and includes transistors CQ11 and CQ12 and stage FF7 includes transistors CQ13 and CQ14. The counter transistors are all of the PNP type.

Operation of each stage of counter 32 is similar to operation of location flip-flop stage 35. For illustrative purposes, assume the digit (0) is stored in each counter stage except FF6, wherein a (1) is stored. Thus, a decimal count of two is stored in the binary counter. When the locomotive passes an additional location, an additional count must be stored in the counter. Assuming an E to W direction of travel, a pulse is produced first by detector A and second by detector B. Line 64 receives a positive clamping voltage, as previously explained. Transistor Q1 of location flip-flop 35 cuts off upon reception of the detector A pulse and resumes conduction upon reception of the detector B pulse. Upon resumption of conduction by transistor Q1, a positive pulse is applied from the collector to shift pulse line 46 and thence through rectifier 68 and a steering diode 94 to the base of non-conducting transistor CQ13 in a manner similar to that previously described for operation of location flip-flop 35. It should be noted that when a (0) is stored in a counter flip-flop stage, the even-numbered transistor of the stage conducts. When a (1) is stored in a counter stage, the odd-numbered transistor of the stage conducts. Thus, in stages FF7 and FF6 transistors CQ14 and CQ11 are conducting and transistors CQ13 and CQ12 are cut off. Upon application of the positive shift pulse to the bases of transistors CQ13 and CQ14, transistor CQ14 cuts off and transistor CQ13 begins conduction, again in a manner similar to that explained for operation of location flip-flop 35. Thus, a positive pulse appears on the read-out bus of flip-flop stage FF7 indicating that a (1) is stored in stage FF7. The collector of transistor CQ14 is coupled to the bases of transistors CQ11 and CQ12 through a series circuit including a diode 83. The negative pulse produced on the collector of transistor CQ14 at the instant of cut-off is not conducted to the bases of transistors CQ11 and CQ12 because line 64 is clamped at a positive voltage, back-biasing diode 83 which thus presents a high impedance to negative voltages. Because a positive pulse appears on the collector of transsistor CQ13 at the start of conduction, the bases of transistors CQ11 and CQ12 cannot receive the pulse due to rectifying action of a diode 95 in a series circuit coupling the collector of transistor CQ13 to the bases of transistors CQ11 and CQ12. Thus, a positive potential remains on the collector of transistor CQ11 because the transistor remains in conduction while transistor CQ12 remains at cut-off. Thus the read-out buses of stages FF7 and FF6 each indicate a binary digit (1) is stored in each of their respective stages, so that the decimal number stored in the counter is now three, one count more than the original count of two.

Again assume a digit (0) is stored in stage FF7 and a digit (1) is stored in stage FF6. Assume locomotive travel now is in the direction of W to E. In this case, detector B produces a pulse prior to detector A. This has the effect of applying a positive clamping voltage on line 65 through diode clamp 30. Upon resumption of transistor Q1 conduction due to receipt of the detector B output pulse, a positive pulse is received by the bases of transistors CQ13 and CQ14. This pulse, through a steering diode 93, drives transistor CQ14 to cut-off, which, due to a resulting negative change in collector voltage, causes transistor CQ13 to conduct. When transistor CQ13 begins conducting, the positive pulse produced on the collector will not be coupled to the bases of transistors CQ11 and CQ12 due to rectifying action of diode 95. It should also be noted that diode 95 is back-biased by line 65 to a high impedance state, during subtraction. However, the negative pulse produced on the collector of transistor CQ14 at the instant of cut-off is coupled to the bases of transistors CQ11 and CQ12 through a series circuit including a diode 83, polarized so as to pass negative pulses. This causes transistor CQ12 to conduct, immediately cutting off transistor CQ11 in a manner similar to that previously explained for operation of location flip-flop 35. Thus, the read-out bus for stage FF5 indicates the binary digit (1) while the read-out bus for stage FF6 indicates the binary digit (0). The decimal number stored in the counter is now one, one count less than the original count of two.

The read-out buses receive the signal in parallel code form. Thus, presence of a positive voltage on the collector of any of the odd numbered transistors indicates conduction of the odd-numbered transistor and therefore that a (1) is stored in that stage. Likewise, absence of a positive voltage on the collector of any odd-numbered transistor indicates non-conduction of the transistor and therefore that a (0) is stored in the flip-flop stage incorporating the transistor.

The remaining stages FF1–FF5 operate in a manner similar to that explained for stages FF7 and FF6. It should also be noted that the read-out buses of stages FF1–FF7 may be connected to a binary storage circuit such as described in the aforementioned Pettitt application Ser. No. 142,372. The read-in buses are used for transferring codes received by the code receiving equipment to the stages of the reversible binary counter in parallel form. Depending upon polarity of voltage applied to each flip-flop stage bus, each flip-flop can be made to register either a (0) digit or a (1) digit.

Turning next to FIG. 5, a block diagram of means for converting stored binary indications to sequentially modulated VHF is shown. Two discretely different audio tone frequencies are used, one of which is modulated with (1) bits and the other with (0) bits of information. The tones in turn operate a pair of modulators 100 and 101 respectively, which through an amplified 106 modulate a VHF transmitter 102 supplying the radio link between locomotive and control tower. A monostable clock 103 produces pulses which are applied to a pair of AND circuits 104 and 105. The clock 103 serially samples each stage of a code communication system binary storage circuit 107 at intervals determined by a clock gate signal applied to the clock, producing a serial code output. Detection of (1) bits produces an output from AND circuit 104, while detection of (0) bits produces an output from AND circuit 105. Output of transmitter 102 thus carries modulation produced by a pair of tones depending upon the number stored in the storage circuit 107. The tone frequencies can easily be detected at the receiving station by conventional means, thus deriving the original binary bits of information.

Thus there has been described a counting system which is compatible with binary storage systems. The counting system utilizes inert devices for activating a counter, and provides a system for counting predetermined locations passed by a vehicle independent of vehicular orientation, stops and reverses, and without need of a wayside source of energy. The system facilitates monitoring of all trains within a track network at a central location.

Having described a reversible counting system for locating moving objects as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. A reversible counting system comprising the combination of a binary counter capable of accepting a predetermined count from an external source, means for setting a predetermined count in the counter, a plurality of pairs of inert coils disposed at several locations, one coil of each of the pairs being tuned to one common frequency and the other coil of each of the pairs being tuned to a second common frequency, a pair of pick-up coils, one of the pick-up coils being tuned to the one common frequency and the other of the pick-up coils being tuned to the second common frequency, means for altering the count in response to inductive coupling of both pick-up coils with both inert coils at any of the several locations, and means for communicating the altered count to a remote indicator without destroying the count.

2. The reversible counting system of claim 1 wherein spacing between the pick-up coils is less than spacing between the inert coils at any of said locations.

3. A reversible counting system comprising a binary counter for receiving a predetermined count from external means, a plurality of inert spaced coils tuned to different frequencies, means movable relative to the inert coils and having spaced radiating coils tuned to the respective frequencies of the inert coils responsive to proximity with the inert coils for altering the count, and means for communicating the altered count to a remote indicator without destroying the count.

4. A reversible counting system comprising a reversible binary counter capable of accepting a predetermined count from an external source, a pair of pick-up coils, each of the pick-up coils being tuned to a unique frequency, pairs of inert coils disposed at predetermined locations, one coil of each inert coil pair being tuned to one unique frequency and the other coil of each inert coil pair being tuned to the other unique frequency, means for adding a count to the counter upon detection of a pair of inert coils in one sequence by the pick-up coils, means for substracting a count from the counter upon detection of the pair of inert coils in another sequence by the pick up coils, and means for communicating the count to a remote indicator without destroying the count.

5. The reversible counting system of claim 4 wherein spacing between the pick up coils is less than spacing between inert coils in each of the inert coil pairs.

6. The reversible counting system of claim 4 wherein the means for communicating the altered count to a remote indicator without destroying the count comprises a tone modulated radio link.

7. A reversible counting system for counting locations of respective pairs of inert coils passed by vehicles comprising first resonant circuit means including one of the inert coils disposed at each location and tuned to one predetermined frequency, second resonant circuit means including the other of the inert coils disposed at each location at a first predetermined distance from said first resonant circuit means and tuned to a second predetermined frequency, a first detection means including a first radiating pick up coil disposed on a vehicle and tuned to the predetermined frequency of said first resonant circuit means, second detection means including a second radiating pick up coil disposed on the vehicle at a distance from said first detection means less than the first predetermined distance and tuned to the second predetermined frequency, and a reversible counter mounted on the vehicle controlled by the first and second detecting means for registering in ascending or descending order the number of locations traversed by the vehicle independent of vehicular orientation and dependent only upon vehicular direction of travel.

8. A system for counting the number of locations of respective pairs of inert coils traversed by an object comprising a reversible binary counter, read-in means connected to the counter for selectively altering the count therein, read-out means connected to the counter for providing an indication of the count stored within the counter, detecting means including a pair of inductive circuits mounted on the object, each of the inductive circuits comprising a radiating pick up coil tuned to a distinctive frequency, for detecting proximity of the object to one of the locations, direction detecting means including the pair of inductive circuits and the spaced inert coils for detecting direction of travel of the object, means for altering the count in the counter according to the number of locations traversed and the direction of travel, and means communicating the altered count to a central location.

9. A reversible counting system comprising a binary counter having a predetermined count present therein, pairs of inert tuned coils disposed at a plurality of predetermined locations, a pair of radiating tuned pick-up coils, and means coupling the radiating tuned coils to the binary counter for altering the count after both radiating coils have individually inductively coupled a different inert coil of one of the pairs of inert coils.

10. The reversible counting system of claim 9 wherein the means coupling the radiating tuned coils to the binary counter includes means responsive to loading of the pick-up coils.

11. A reversible counting system comprising the combination of a binary counter capable of accepting a predetermined count in parallel code form from an external source, a plurality of pairs of inert coils, one coil of each of the pairs being tuned to one common frequency and the other coil of each of the pairs being tuned to a second common frequency, a pair of pick-up coils, one of the pick-up coils being tuned to the one common frequency and the other of the pick-up coils being tuned to the second common frequency, detector means connected to one of the pick-up coils for producing one signal upon inductive coupling of one pick-up coil with one coil of a pair of inert coils, detector means connected to the other of the pick-up coils for producing a second signal upon inductive coupling of the second pick-up coil with the second coil of the pair of inert coils, means for adding a count to the counter upon production of the signals in one sequence, means for subtracting a count from the counter upon production of the signals in another sequence, means for preventing actuation of the counter when the signals are produced at instances separated by more than a predetermined time interval, and means for providing a parallel code read-out without destroying the count.

12. A reversible counting system comprising a combination of a binary counter capable of accepting a predetermined count in parallel code form from an external source, a plurality of pairs of inert coils, one coil of each of the pairs being tuned to one common frequency and the other coil of each of the pairs being tuned to a second common frequency, a pair of pick-up coils, one of the pick-up coils being tuned to the one common frequency and the other of the pick-up coils being tuned to the second common frequency, detector means connected to one of the pick-up coils for producing one signal upon inductive coupling of one pick-up coil with one coil of a pair of inert coils, detector means connected to the other of the pick-up coils for producing a second signal upon inductive coupling of the second pick-up coil with the second coil of the pair of inert coils, direction determining means responsive to the signals for conditioning the counter to add or subtract depending upon the sequence of signal production, means preventing actuation of the counter when the detector signals are produced at instances separated by more than a predetermined time interval, and means for providing a non-destructive parallel code count read-out.

13. A reversible counting system comprising the combination of a binary counter capable of accepting a predetermined count in parallel code form from an external source, a plurality of pairs of inert coils, one coil of each of the pairs being tuned to one common frequency and the other coil of each of the pairs being tuned to a second common frequency, a pair of pick-up coils, one of the pick-up coils being tuned to the one common frequency and the other of the pick-up coils being tuned to the second common frequency, detector means connected to one of the pick-up coils for producing one signal upon inductive coupling of one pick-up coil with one coil of a pair of inert coils, detector means connected to the other of the pick-up coils for producing a second signal upon inductive coupling of the second pick-up coil with the second coil of the pair of inert coils, location determining means producing a shift pulse for actuating the binary counter upon reception of both of the signals within a predetermined time interval, direction determining means responsive to the first-produced signal for conditioning the counter to add or subtract, and means for non-destructively reading out the count in parallel form.

14. The reversible counting system of claim 13 having additional means for resetting the location determining means when only one signal is produced during the predetermined time interval, thereby enabling the location determining means to produce a shift pulse upon reception of a new pair of signals within the predetermined time interval.

References Cited by the Examiner

UNITED STATES PATENTS

| | | | |
|---|---|---|---|
| 2,708,746 | 6/1955 | Shaw | 340—258 |
| 2,765,459 | 10/1956 | Winter | 340—347 |
| 2,883,108 | 3/1959 | Thornton | 235—92 |
| 3,023,371 | 2/1962 | Balish et al. | 331—38 |
| 3,129,414 | 3/1964 | Rice | 340—258 |
| 3,185,819 | 6/1965 | Greiner | 235—92 |

MAYNARD R. WILBUR, *Primary Examiner.*

JOHN F. MILLER, *Examiner.*